United States Patent
Hutchison et al.

(10) Patent No.: US 9,500,827 B2
(45) Date of Patent: Nov. 22, 2016

(54) APPARATUS, METHOD AND SYSTEM FOR SPECTROMETRY WITH A DISPLACEABLE WAVEGUIDE STRUCTURE

(71) Applicant: Intel Corporation, Santa Clara, CA (US)

(72) Inventors: David N. Hutchison, Santa Clara, CA (US); Kyu Hyun Kim, Ann Arbor, CA (US); Haisheng Rong, Pleasanton, CA (US); John Heck, Berkeley, CA (US); Shengbo Xu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/317,132

(22) Filed: Jun. 27, 2014

(65) Prior Publication Data
US 2015/0377705 A1    Dec. 31, 2015

(51) Int. Cl.
*G01J 3/28* (2006.01)
*G02B 6/42* (2006.01)
(Continued)

(52) U.S. Cl.
CPC ............ *G02B 6/4295* (2013.01); *G01J 3/0259* (2013.01); *G01J 3/1895* (2013.01); *G01J 3/32* (2013.01); *G01J 3/1809* (2013.01)

(58) Field of Classification Search
CPC ................ G01J 3/02; G01J 3/10; G01J 3/18; G01J 3/28; G01J 3/2803; G01J 3/2823
USPC .................................................. 356/300–445
See application file for complete search history.

(56) References Cited

U.S. PATENT DOCUMENTS

| 5,261,015 A | 11/1993 | Glasheen |
| 2002/0176171 A1 | 11/2002 | Berolo et al. |

(Continued)

FOREIGN PATENT DOCUMENTS

| CN | 101368848 | 2/2009 |
| JP | 2001-305361 | 10/2001 |

(Continued)

OTHER PUBLICATIONS

International Search Report and Written Opinion from PCT/US2015/032451 mailed Aug. 27, 2015, 16 pgs.
(Continued)

*Primary Examiner* — Abdullahi Nur
(74) *Attorney, Agent, or Firm* — Green, Howard & Mughal, LLP (57) ABSTRACT

Techniques and mechanisms for a monolithic photonic integrated circuit (PIC) to provide spectrometry functionality. In an embodiment, the PIC comprises a photonic device, a first waveguide and a second waveguide, wherein one of the first waveguide and the second waveguide includes a released portion which is free to move relative to a substrate of the PIC. During a metering cycle to evaluate a material under test, control logic operates an actuator to successively configure a plurality of positions of the released portion relative to the photonic device. In another embodiment, light from the first waveguide is variously diffracted by a grating of the photonic device during the metering cycle, where portions of the light are directed into the second waveguide. Different wavelengths of light diffracted into the second waveguide may be successively detected, for different positions of the released portion, to determine spectrometric measurements over a range of wavelength.

20 Claims, 8 Drawing Sheets

(51) Int. Cl.
*G01J 3/32* (2006.01)
*G01J 3/02* (2006.01)
*G01J 3/18* (2006.01)

(56) References Cited

U.S. PATENT DOCUMENTS

| | | |
|---|---|---|
| 2003/0095737 A1 | 5/2003 | Welch et al. |
| 2004/0017971 A1 | 1/2004 | Johannessen |
| 2009/0263075 A1 | 10/2009 | Rhee |
| 2010/0272394 A1 | 10/2010 | Okamoto |
| 2011/0096326 A1 | 4/2011 | Crafts et al. |
| 2012/0002918 A1 | 1/2012 | Kawashima et al. |
| 2012/0113422 A1 | 5/2012 | Kivioja et al. |
| 2013/0083315 A1* | 4/2013 | Lo ............... G01J 3/46 356/73 |
| 2013/0122537 A1 | 5/2013 | Margalit et al. |
| 2014/0085632 A1 | 3/2014 | Preston et al. |

FOREIGN PATENT DOCUMENTS

| | | |
|---|---|---|
| TW | 201142255 | 12/2011 |
| WO | WO-2015084332 | 6/2015 |

OTHER PUBLICATIONS

International Preliminary Report on Patentability from PCT/US2013/072865 mailed Sep. 2, 2014, 3 pgs.
International Search Report and Written Opinion for International Patent Application No. PCT/US13/72865 mailed Sep. 2, 2014, 14 pages.
Office Action and Search Report for Taiwan Patent Application No. 104116077 mailed Apr. 22, 2016, 11 pages.
Cragun, et al., "Linear Thermomechanical Microactuators", Mechanical Engineering Department, Brigham Young Univ. Provo, Utah, MEMS-vol. 1, Microelectromechanical Systems—1999, pp. 181-188, 8 pages.
Hasegawa, et al., "Athermal AWG Module with Extremely Low Temperature Dependence (<+/−5pm) of Center Wavelength using Multi-Compensating Plates", DOI: 10.1109/ECOC.2006.4801038, Aug. 2006, The Furukawa Electric Co., Ltd., 2 pages.
Kim, et al., "Athermal AWG Multiplexer/Demultiplexer for E/C-Band WDM-PON Application", Optical Fiber Communication and Optoelectronics Conference, 2007, Asia Oct. 17-19, 2007, DOI: 10.1109/AOE.2007.4410797, pp. 330-332, 3 pages.
Legtenberg, et al., "Comb-Drive Actuators for Large Displacements", MESA Research Institute, University of Twente, The Netherlands. J. Micromech. Microeng. 6 (1996). pp. 320-329, 10 pages.
Leick, et al., "Athermal AWGs for Colourless WDM-PON with −40°C. to +70°C. and Underwater Operation", 2005 Optical Society of America, 3 pages.
Sehr, et al., "Fabrication and Test of Thermal Vertical Bimorph Actuators for Movement in the Wafer Plane", Department of Electronics and Computer Science, Univ. of Southampton, Highfield, Southampton, UK, Institute of Physics Publishing, Journal of Micromechanics and Microengineering 11 (2001) pp. 306-310, 5 pages.
International Preliminary Report on Patentability for International Patent Application No. PCT/US13/72865 mailed Jun. 16, 2016, 11 pages.

* cited by examiner

APPARATUS, METHOD AND SYSTEM FOR SPECTROMETRY WITH A DISPLACEABLE WAVEGUIDE STRUCTURE

BACKGROUND

1. Technical Field

The present invention relates generally to photonic devices. More particularly, certain embodiments relate generally, but not exclusively, to an apparatus and method for performing dispersive spectrometry.

2. Background Art

As the portable device market grows, the need for compact and energy efficient sensors has increased. Recent improvements in optical spectroscopic sensors have provided for increasingly diverse applications in biological and environmental sensing. Spectrometers are an essential component for optical spectroscopy. A photonic integrated circuit (PIC) includes monolithically integrated photonic devices or elements and can be useful as a spectrometer in applications such as biological and environmental sensing.

Currently, commercially available on-chip spectrometers variously rely on some array of stationary waveguides which are to propagate each to a respective detector a different wavelength of diffracted light. One limitation of this approach is that spectroscopy is typically interested in characterizing some approximation of a continuous wavelength range of a light spectrum. To better achieve this characterization, conventional on-chip spectrometry techniques seek to position output waveguides as close to one another as possible. However, such close proximity is limited by resulting crosstalk, wherein light at a given wavelength incorrectly contributes to measurements made by different detectors coupled to respective adjacent output waveguides. Where conventional techniques seek to reduce crosstalk by increasing the spacing between waveguides, continuous spectrum measurements suffer as a result.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and/or mechanisms to provide on-chip spectrometry with a mechanically movable waveguide. In embodiments, a PIC is a monolithic device including at least an optical waveguide and a photonic device disposed over the same substrate and optically coupled to the waveguide. The waveguide may include an anchored portion rigidly coupled to a substrate, and a displaceable portion extending from the anchored portion. With a microelectromechanical system (MEMS) based actuator coupled thereto, the displaceable portion may be variously repositioned relative to the photonic device, which comprises a diffraction grating (e.g. an Echelle grating). In an embodiment, the waveguide exchanges with the photonic device a portion of light received from a sample material. During the exchange of the light, the displaceable portion may be continuously moved with the MEMS-based actuator. As a result, an output waveguide may be exposed to a continuously-changing range of wavelengths of light diffracted by the grating.

Figure 1A:
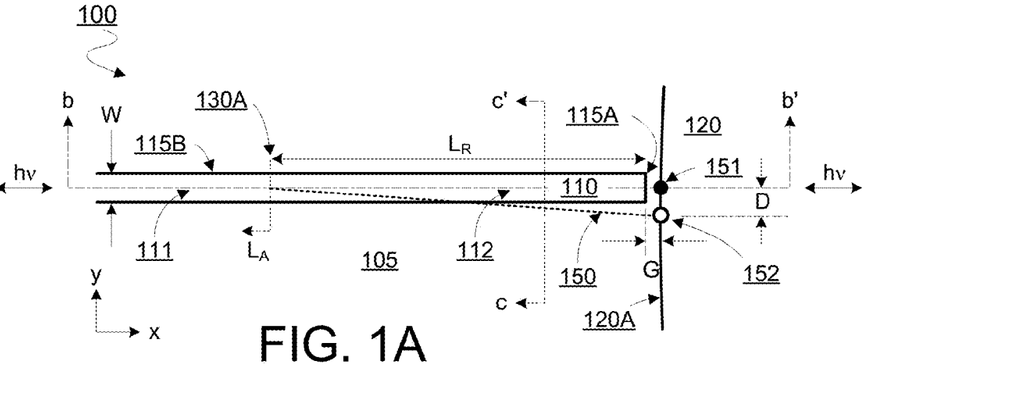
FIG. 1A is a plan view of a PIC integrating onto a single substrate a physically displaceable optical waveguide adjacent to a photonic device, in accordance with an embodiment.

FIG. 1A is a plan view of a PIC 100 integrating onto a single substrate 105 a physically displaceable optical waveguide 110 adjacent to a physically anchored photonic device 120, in accordance with an embodiment. Photonic device 120 may be disposed over a first region of substrate 105 and include a grating (not shown) to diffract light received via waveguide 110, or to diffract light toward waveguide 110. Optical waveguide 110 may be disposed over a second region of substrate 105 and may be generally planar, in the plane of substrate 105 and co-planar (i.e., in the same plane) with photonic device 120. Strip or rib sidewalls 115B may define a transverse or lateral width W of waveguide 110. The width W may vary with material system and wavelength, but for one exemplary silicon embodiment, waveguide width W may be advantageously between 1 μm and 10 μm for propagated light having one or more components in a range of wavelengths. A similar range may also be applicable to the z-height of waveguide 110. By way of illustration and not limitation, waveguide 110 may propagate light which includes components in a wavelength range of 1250 nm to 1400 nm. However, light of any of various other wavelength ranges may be propagated by waveguide 110, depending upon implementation-specific details.

Optical waveguide 110 may be of a material having sufficient index contrast with surrounding materials to guide by total internal reflection (TIR) electromagnetic waves in the optical spectrum (hν) along a longitudinal waveguide length L. In embodiments, optical waveguide 110 includes at least one anchored waveguide portion 111 that is physically anchored to substrate 105 along an anchored longitudinal length $L_A$, and at least one released waveguide portion 112 that is physically released from substrate 105 along a released longitudinal length $L_R$.

As further illustrated in FIG. 1A, released waveguide portion 112 may also be physically separated from photonic device 120 with a waveguide end facet 115A proximate to photonic device 120. Waveguide end facet 115A may be separated from a photonic device end facet 120A by a free-space gap G. Waveguide 110 may be optically coupled to photonic device 120 across the free-space gap G with an optical mode (e.g. including one of multiple wavelengths of propagating light) therefore to traverse the free-space gap G and couple into (or out of) photonic device 120 at a launch point 151. Launch point 151 may be physically displaced through a displacement of released waveguide portion 112 in one or more dimensions relative to substrate 105. In advantageous embodiments, an interaction between photonic device 120 and light propagated in waveguide 110 may be altered by controlling physical displacement of released waveguide portion 112. In the exemplary embodiment where optical waveguide 110 is cantilevered from a fixed anchor point on substrate 105 distal from photonic device 120, launch point 151 may be physically displaced through elastic deflection of released waveguide portion 112 in one or more dimensions relative to substrate 105.

In an embodiment, a released portion of an optical waveguide end is laterally displaceable within the xy plane of the substrate from an anchored portion of the waveguide. As further shown in FIG. 1A, a longitudinal axis of anchored waveguide portion 111 is aligned with the cross-section plane b-b'. Released waveguide portion 112 may be of a length sufficient based on the modulus of elasticity of the waveguide material and area moment of inertia of waveguide 110 to achieve an angle of deflection from anchor point 130A such that a longitudinal axis $L_A$ of released waveguide portion 112 follows dashed line 150 and launch point 151 is laterally displaced by end facet displacement distance D, to launch point 152.

Figure 1B:
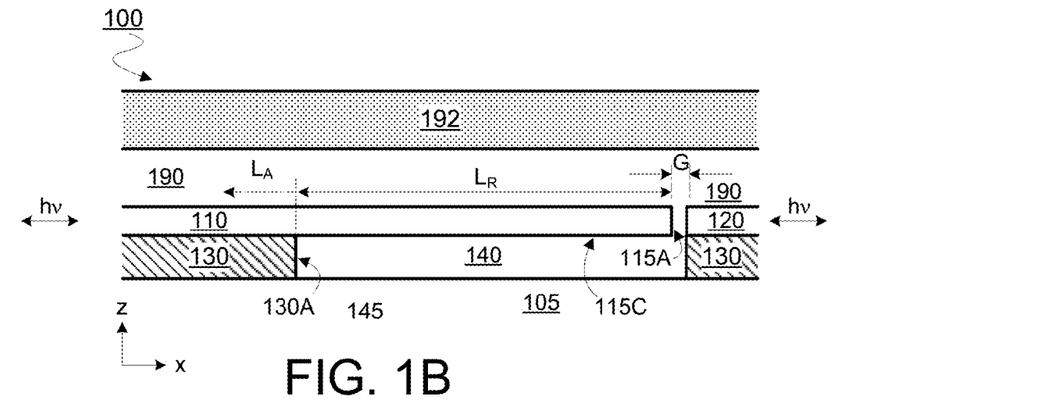
FIG. 1B is a cross-sectional view of the PIC depicted in FIG. 1A along the b-b' line shown in FIG. 1A, in accordance with an embodiment.

FIG. 1B is a cross-sectional view of PIC 100 along the b-b' line shown in FIG. 1A, in accordance with an embodiment. As shown, optical waveguide 110 comprises a device layer disposed over substrate 105. Substrate 105, may be any substrate known in the art to be suitable for forming an IC, such as, but not limited to, a semiconductor substrate, a semiconductor-on-insulator (SOI) substrate, an insulator substrate (e.g., sapphire), or the like, and/or combinations thereof. In advantageous embodiments, optical waveguide 110 is a crystalline (e.g., substantially monocrystalline) semiconductor layer, such as silicon. Alternative semiconductors, such as germanium, SiGe, as well as other compound semiconductors, such as InP, are also possible. Optical waveguide 110 may be separated from substrate 105 by an intervening material 130 of sufficiently high index contrast with the waveguide material. In the exemplary embodiment where optical waveguide 110 and substrate 105 are both crystalline silicon, intervening material 130 may be silica. In one such embodiment, where substrate 105 is a silicon SOI substrate, a silicon optical waveguide 110 may be patterned into the silicon device layer of substrate 105. Photonic device 120 may be planar with waveguide 110 (i.e., having the same z-height) and may be within the same device layer as waveguide 110. As further illustrated in FIG. 1B, a bottom void 140 having the released longitudinal length $L_R$ may be below waveguide 110 and proximate to photonic device 120 with the intervening material layer 130 present as the anchor along the anchored longitudinal length $L_A$. Similarly, a top void 190 may be present over waveguide 110 along at least the released longitudinal length $L_R$, and may optionally extend further. Although certain embodiments are not limited in this regard, disposed over waveguide 110 may be a shell 192 of any material known in the art to provide suitable protection for monolithic released structures of this type.

Figure 1C:
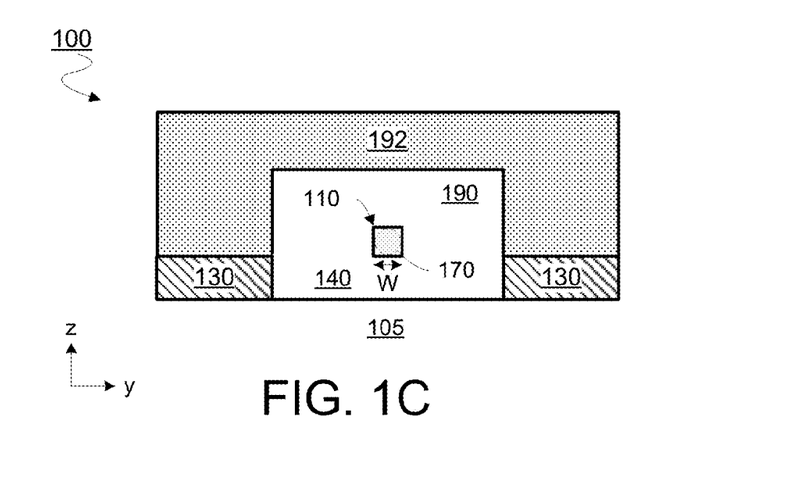
FIG. 1C is a cross-sectional view of the PIC depicted in FIG. 1A along the c-c' line shown in FIG. 1A, in accordance with an embodiment.

FIG. 1C is a cross-sectional view of the PIC 100 along the c-c' line shown in FIG. 1A, and further illustrates how the waveguide 110 may be fully released from surrounding materials. As also depicted in FIG. 1C, waveguide 110 contains one or more modes of light 170 in the z and y dimensions as it propagates in the x dimension along the released longitudinal length $L_R$.

Figure 2A:
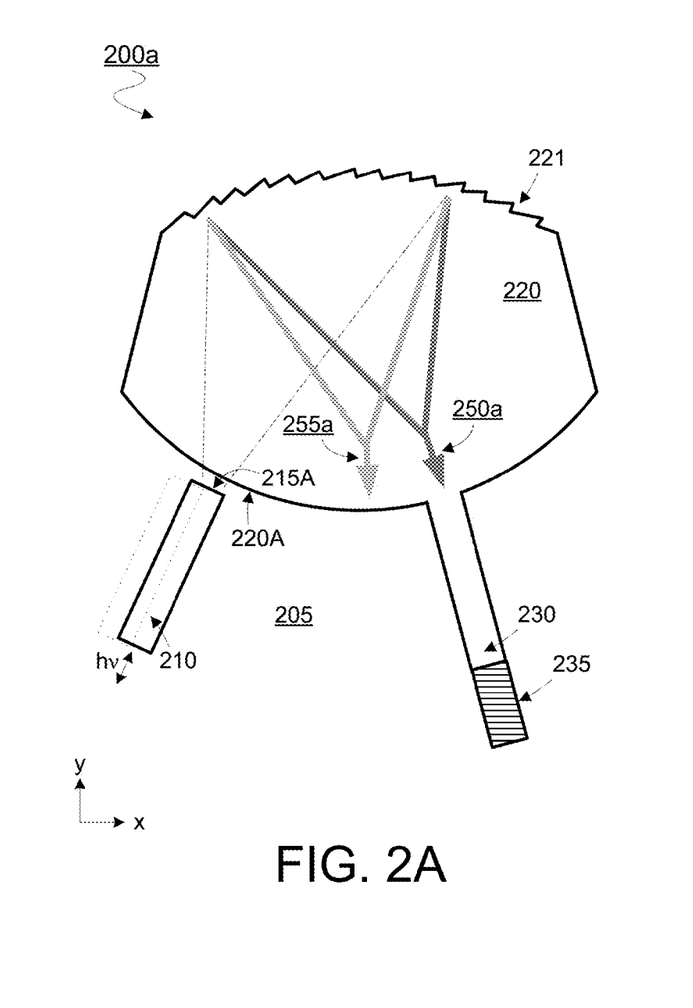
FIGS. 2A, 2B are plan views of a PIC with a displaceable waveguide, in accordance with an embodiment.

FIG. 2A is a plan view 200a of a PIC with a single displaceable waveguide 210, in accordance with an embodiment. As illustrated, displaceable waveguide 210 may be at least partially physically free of substrate 205, for example substantially as illustrated in FIGS. 1A-1C. Waveguide end facet 215A may be at least laterally movable over the distance D and separated from facet 220A of a photonic device 220 by free-space gap G. Waveguide 210 and photonic device 220 may each be of silicon, for example having the material stack structure described in the context of FIGS. 1B and 1C. Photonic device 220 may include a grating—as represented by the illustrative Echelle grating 221—and a physically anchored or fixed waveguide 230. During a spectrometric measurement cycle to evaluate a sample material, components of light having various wavelengths may propagate between displaceable waveguide 210 and photonic device 220, through waveguide end facet 215A, traversing the free-space gap G, through facet 220A, and variously diffracting at Echelle grating 221.

By way of illustration and not limitation, a position of waveguide 210 relative to photonic device 220 (and thus, relative to Echelle grating 221), may result in diffraction which separates light 250a having a first wavelength from light 255a having a second wavelength. Other diffracted light (not shown) may be similarly separated according to respective wavelengths. Due at least in part to the position of waveguide 210, diffracted light 250a may be directed into a waveguide 230 which extends from (or in other embodiments, is separate from but proximate to) a side of photonic device 220 such as facet 220A. In an embodiment, a terminal end of waveguide 230 is at or proximate to a position which is located on a theoretical Rowland circle for Echelle grating 221. Such a Rowland circle shares a point of tangency with Echelle grating 221, where a radius of curvature of the Rowland circle is half of a radius of curvature of Echelle grating 221. Facet 215A may additionally or alternatively be located at or near a point on such a Rowland circle.

Figure 2B:
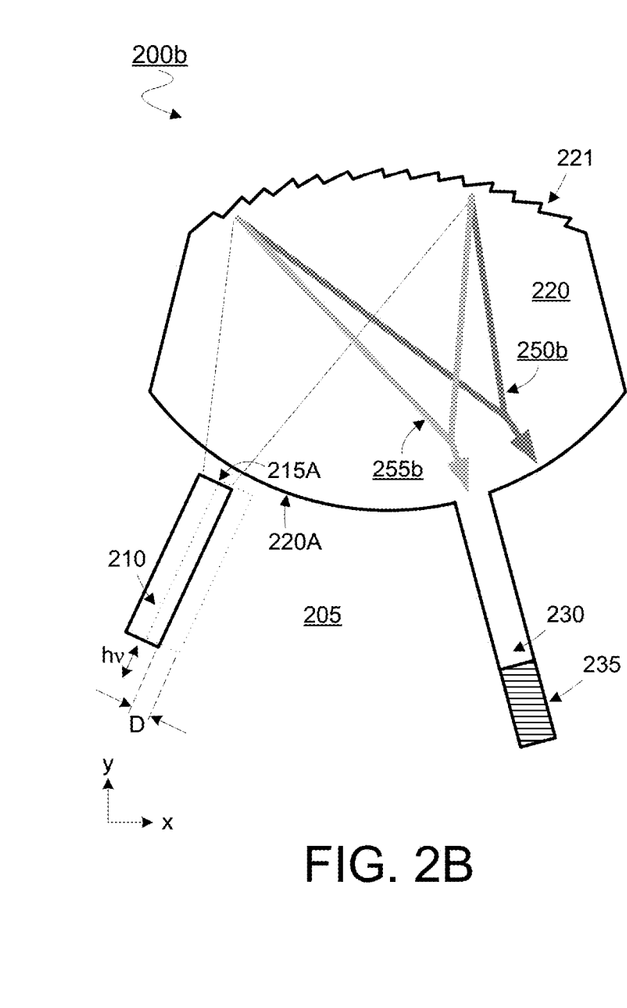

FIG. 2B is a plan view 200b of the PIC represented in FIG. 2A, wherein the PIC has been configured by an actuator mechanism (not shown) to have a different position of waveguide 210 relative to photonic device 220. Due to this reconfigured position of waveguide 210, light from waveguide 210 is incident upon Echelle grating 221 at a different angle. In the illustrative scenario, diffraction of such light results in separation of light 250b (having the first wavelength of light 250a) from light 255b (having the second wavelength of light 255a). However, due to different incidence angle, light 255b—rather than light 250b—is directed into waveguide 230. Accordingly, certain embodiments variously provide for an output waveguide, such as waveguide 230, to receive continuously varying wavelengths of diffracted light during a spectrometric measuring cycle. A detector 235 coupled to receive such diffracted light via waveguide 230—e.g. the detector 235 including any of a variety of conventional photodetector circuits—may perform successive measurements each for a respective wavelength of a spectral range.

As a result, the PIC of FIGS. 2A, 2B may include relatively few output waveguides—e.g. only one such waveguide—thereby reducing or even eliminating the problem of crosstalk in on-chip spectrometry applications.

The various diffracting of light 250a and light 255b to respective locations of facet 220A may further depend, for example, on parameters of grating 221 and refractive index of photonic device 220. Where photonic device 220 is of silicon and its refractive index (RI) changes considerably with temperature, a significant frequency (wavelength) shift may occur if the PIC temperature varies during operation.

In certain embodiments, a displaceable input waveguide includes a released waveguide portion that may be free to undergo a displacement relative to the substrate (and relative to the photonic device) sufficient to variously direct diffracted light of different wavelengths to an output waveguide. Additionally or alternatively, a released portion of an output waveguide may be free to undergo elastic deflection sufficient for the output waveguide to receive different wavelengths of diffracted light. In embodiments where photonic device RI is temperature dependent, a released waveguide portion may undergo a degree of deflection relative to substrate 205 and photonic device 220 to at least partially compensate for such temperature dependence, rendering spectrometric measurement with the PIC more thermally insensitive, or "athermalized." By way of illustration and not limitation, a silicon photonic device 220 may experience a frequency shift at a given location of facet 220A of approximately 10 GHz/° C. With a sufficiently long released length, waveguide 210 may be readily offset over distances of a few microns, and indeed even over tens of microns, using passive and/or active micro-electro-mechanical system (MEMS) actuator techniques.

Figure 3A:
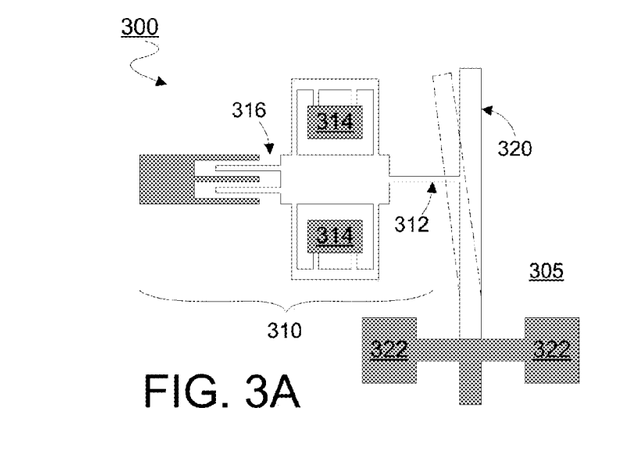
FIGS. 3A through 3C are plan views each of a respective PIC with a displaceable waveguide, in accordance with different embodiments.

In embodiments, a displaceable optical waveguide is to be actively displaced relative to the substrate. Active displacement may be through a MEMS actuator disposed over the substrate and mechanically or electrically coupled to the optical waveguide. FIG. 3A is a plan view of a PIC 300 with an actively displaceable waveguide 320, in accordance with an embodiment. PIC 300 may include all the attributes and features of the PIC previously described with reference to FIGS. 2A, 2B. PIC 300 further includes MEMS actuator 310, which includes a moveable shuttle 312 that is physically coupled to a released portion of waveguide 320. Shuttle 312 is free (e.g., released) from substrate 305 aside from select anchor points 314 (where shaded regions indicate anchored structures) with lateral spring couplers disposed there between. As shown in FIG. 3A, an etched void extends under released regions of shuttle 312 and a displaceable portion of waveguide 320 which extends from an anchored portion 322. Shuttle 312 further includes movable capacitive drive members 316 configured to electrostatically couple with corresponding immobile capacitive drive members anchored to substrate 305. While actuator 310 is exemplified as an electrostatic comb drive, where such MEMS actuators are known to readily achieve lateral shuttle displacements of microns and even tens of microns, other actuator designs are also possible (e.g., employing variable capacitive gaps or even inductive drives).

Figure 3B:
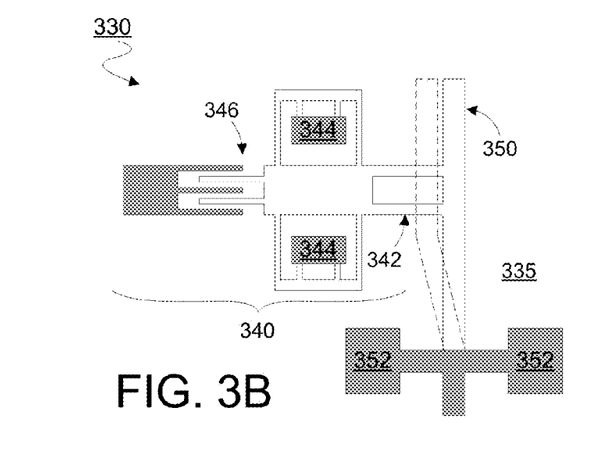

FIG. 3B is a plan view of a PIC 330 with an actively displaceable waveguide 350, in accordance with an alternate embodiment. PIC 330 may include structures proving functionality corresponding to that of PIC 300. For example, a PIC 330 may include a MEMS actuator 340 comprising a moveable shuttle 342 physically coupled to a released portion of a waveguide 350. Aside from select anchor points 344, shuttle 342 may be free from substrate 335, with lateral spring couplers disposed there between. An etched void may extend under released regions of shuttle 342 and a displaceable portion of a waveguide 350 which extends from an anchored portion 352. Shuttle 342 may further include movable capacitive drive members 346 configured to electrostatically couple with corresponding immobile capacitive drive members anchored to substrate 335. In FIG. 3B, two (or more) contact points couple shuttle 342 to the released portion of waveguide 350. As a result, movement of the released portion of waveguide 350 by operation of MEMS actuator 340 may be relatively translational/lateral—e.g. as compared to a more angular movement of waveguide 320 by MEMS actuator 310.

Figure 3C:
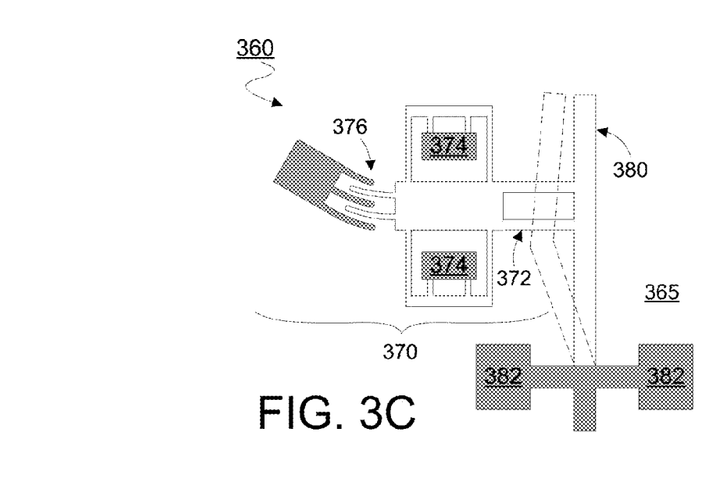

FIG. 3C is a plan view of a PIC 360 with an actively displaceable waveguide 380, in accordance with another embodiment. PIC 360 may include a MEMS actuator 370 comprising a moveable shuttle 372 physically coupled to a released portion of a waveguide 380. Anchor points 374 may fix a shuttle 372 which is otherwise free from substrate 365. An etched void may extend under released regions of shuttle 372 and a displaceable portion of a waveguide 380 which extends from an anchored portion 382. Shuttle 372 may further include movable capacitive drive members 376 configured to electrostatically couple with corresponding immobile capacitive drive members anchored to substrate 365. In FIG. 3C, movable capacitive drive members 376 are part of a curved and/or angled MEMS actuator 370. As a result, movement of the released portion of waveguide 380 by operation of MEMS actuator 370 may include an angular motion of the released portion which, for example, is opposite to a direction of angular motion which MEMS actuator 310 provides for waveguide 320.

Figure 4:
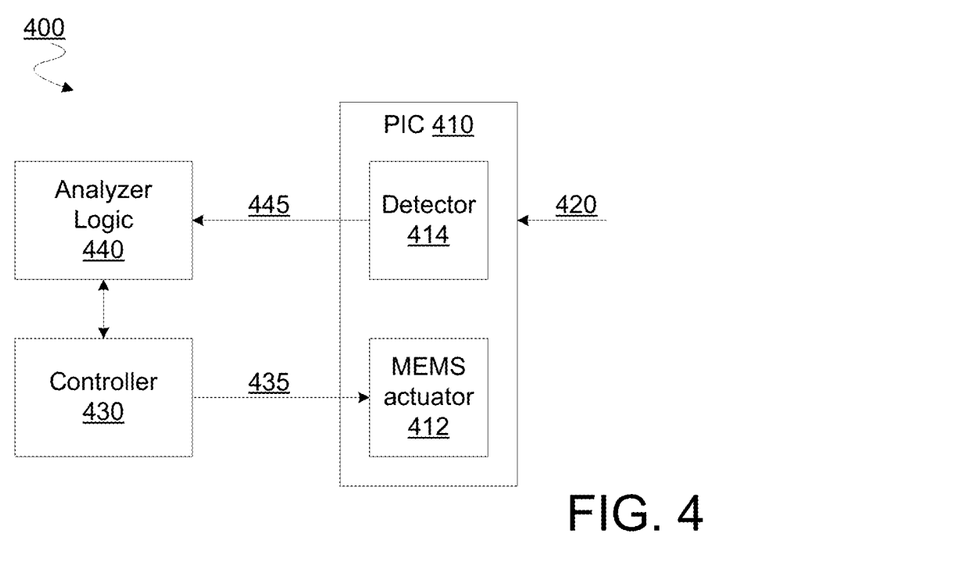
FIG. 4 is a function block diagram of a spectrometric measurement and analysis system, in accordance with an embodiment.

FIG. 4 is a function block diagram of a measurement system 400 including an on-chip spectrometer, in accordance with an embodiment. System 400 may include a PIC 410 which, for example, includes some or all of the moveable waveguide features discussed herein.

During a measurement cycle to evaluate a given material, PIC 410 may receive light 420 which, for example, has been transmitted through or reflected from the sample material. At some time during the measurement cycle, a controller 430 of system 400 may provide signals 435 to operate a MEMS actuator 412 of PIC 410. Controller 430 may be integrated into PIC 410, in various other embodiments. In response to signals 435, MEMS actuator 412 may successively configure various positions, relative to one another, of a grating structure (not shown) of PIC 410—such as photonic device 220—and a waveguide (not shown) of PIC 410. Such operation of MEMS actuator 412 may result in a detector 414 of PIC 410 successively receiving—e.g. via an output waveguide (not shown) of PIC 410—different respective wavelengths of light 420 as it is diffracted by the grating structure of PIC 410. Although certain embodiments are not limited in this regard, system 400 may further comprise a temperature sensor (not shown) coupled to provide to controller 430 signaling indicating a temperature or other thermal state of PIC 410. Controller 430 may include an offset component in signals 435 to provide for modified operation of MEMS actuator 412 which, for example, compensates for temperature-based changes to the RI of the grating structure.

In response to diffraction of light 420 and operation of MEMS actuator 412, detector 414 may generate signals 445 indicating various levels (e.g. of optical signal strength) for the diffracted light sensed with detector 414. Signals 445 may be provided, for example, to analyzer logic 440 which is coupled to (or alternatively, integrated with) PIC 410. Analyzer logic 440 may comprise hardware logic and/or executing software logic configured to variously associate the detected levels (or other characteristics), as indicated by signals 445, each with a respective wavelength of light. For example, analyzer logic 440 may be coupled to receive—e.g. directly or indirectly from controller 430—information specifying or otherwise indicating wavelengths of light which each correspond to a respective operational state of MEMS actuator 412. By way of illustration and not limitation, analyzer logic 440 and/or controller 430 may have access to (or be programmed in advance with) calibration information which identifies or otherwise indicates a correspondence of various values of signals 435 each with a respective wavelength which is expected to be output to detector 414.

Based on such information, analyzer 440 may identify a particular level of detected light, which is currently indicated by signals 445, as corresponding to a particular wavelength associated with a concurrent (or preceding) state of signals 435. Such identified correspondence may be further based on offset information which identifies or otherwise indicates a component of signals 435 which is to compensate for a thermal state of PIC 410. In an embodiment, analyzer 440 identifies successive levels, indicated by signals 445, as corresponding to PIC 410 sweeping through a continuous range of output wavelength.

Figure 5A:
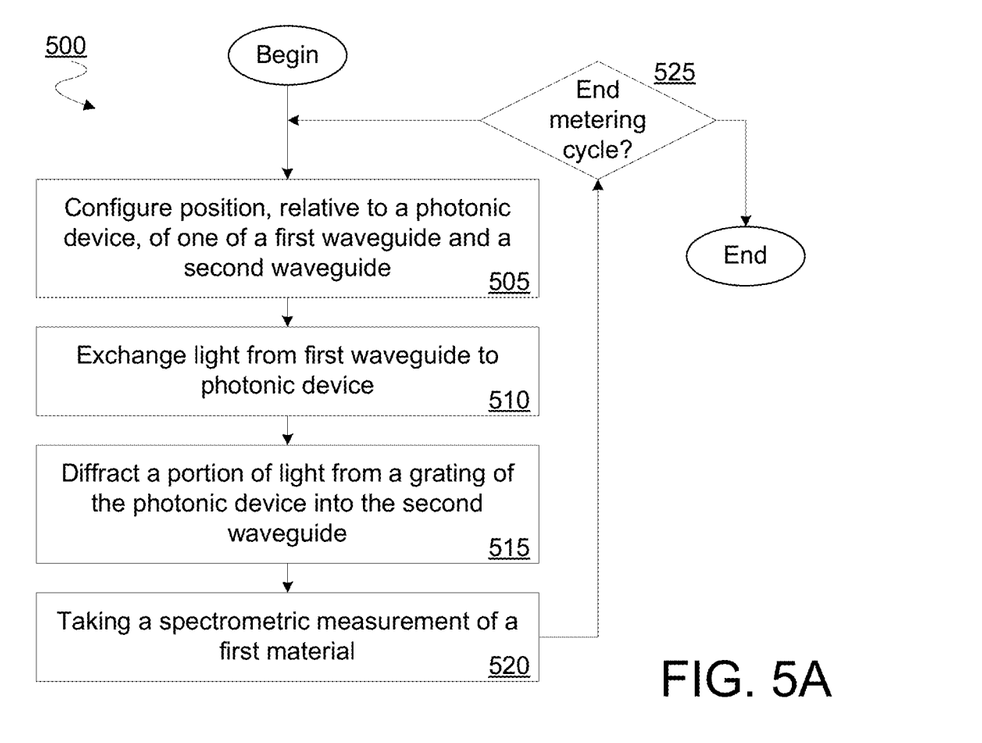
FIG. 5A is a flow diagram illustrating a method of operating a PIC including a monolithic physically displaceable optical waveguide and an adjacent photonic device, in accordance with an embodiment.

FIG. 5A illustrates elements of a method 500 for operating a monolithic PIC according to an embodiment. Method 500 may be performed to determine spectrometric characteristics of a material under test. In an embodiment, method 400 is performed by an apparatus or system which includes some or all of the features of PIC 100, for example.

Method 500 may include operations to successively configure a plurality of positions of a moveable optical waveguide—e.g. one of an input waveguide of the PIC and an output waveguide of the PIC—relative to a photonic device of the PIC. For example, at 505, method 500 may comprise configuring some first position, relative to the photonic device, of one of a first (input) optical waveguide and a second (output) optical waveguide. The configuring at 505 may include sending a control signal to a MEMS-actuator which is coupled to the one of the first waveguide and the second waveguide, the control signal to set a particular amount of displacement of a released portion of the waveguide. The control signal may correspond to a desired wavelength of diffracted light to be received at the second waveguide. For example, the control signal may be determined based on reference information—e.g. including calibration information—which corresponds operational states of the MEMS-actuator each with a different respective output wavelength of diffracted light. In some embodiments, the control signal may be further based on a current thermal state of the photonic device and reference information which corresponds various ones of such thermal states each to a different respective wavelength offset to be compensated.

The configuring of a position at 505 may be subsequently repeated one or more times during a spectrometric cycle implemented with method 500. For each such position, method 500 may perform operations while that position is configured. For example, at 510, method 500 may exchange light, which is received from a material under test, to the photonic device via the first optical waveguide. The light may include components having various respective levels (e.g. of luminance, power and/or the like) and various respective wavelength. Method 500 may further include, at 515, diffracting a portion of the light from a grating of the photonic device into the second optical waveguide. The diffraction at 515 may result in portions (components) of the light being separated from one another by wavelength, where different wavelengths are directed in different directions away from the grating. The particular portion (and wavelength) of light which is directed into the second waveguide at 515 may depend in part upon the particular position configured at 505. In some embodiments, the particular portion may further depend upon a thermal state of the photonic device—e.g. where the RI of the photonic device is sensitive to the thermal state. At 520, method 500 performs taking for the position configured at 505 a respective spectrometric measurement of the material under test. Taking of the measurement at 520 may include generating a signal indicating a level of the diffracted portion of the respective light directed into the second optical waveguide.

In an embodiment, method 500 repeats spectrometric measurements of the material under test for multiple wavelengths of diffracted light. For example, method 500 may evaluate at 525 whether (or not) the spectrometric metering cycle has finished. Such a cycle may be performed, for example, to evaluate the material over a range of wavelengths. Where it determined at 525 that the cycle has not ended, method 500 may return to configuring a next position of the moveable waveguide at 505. By contrast, where the cycle is determined at 525 to have ended, method 500 may end or—in some embodiments—continue on to perform additional operations (not shown) to compile, convert or otherwise process the measurements variously taken at 520. For example, such processing may comprise generating a plot and/or a data structure (e.g. a map, table and/or the like) specifying or otherwise indicating a correspondence of such measurements each with a respective wavelength. Such a plot or data structure may represent a spectrometric profile characterizing the material under test over a continuous wavelength spectrum.

Figure 5B:
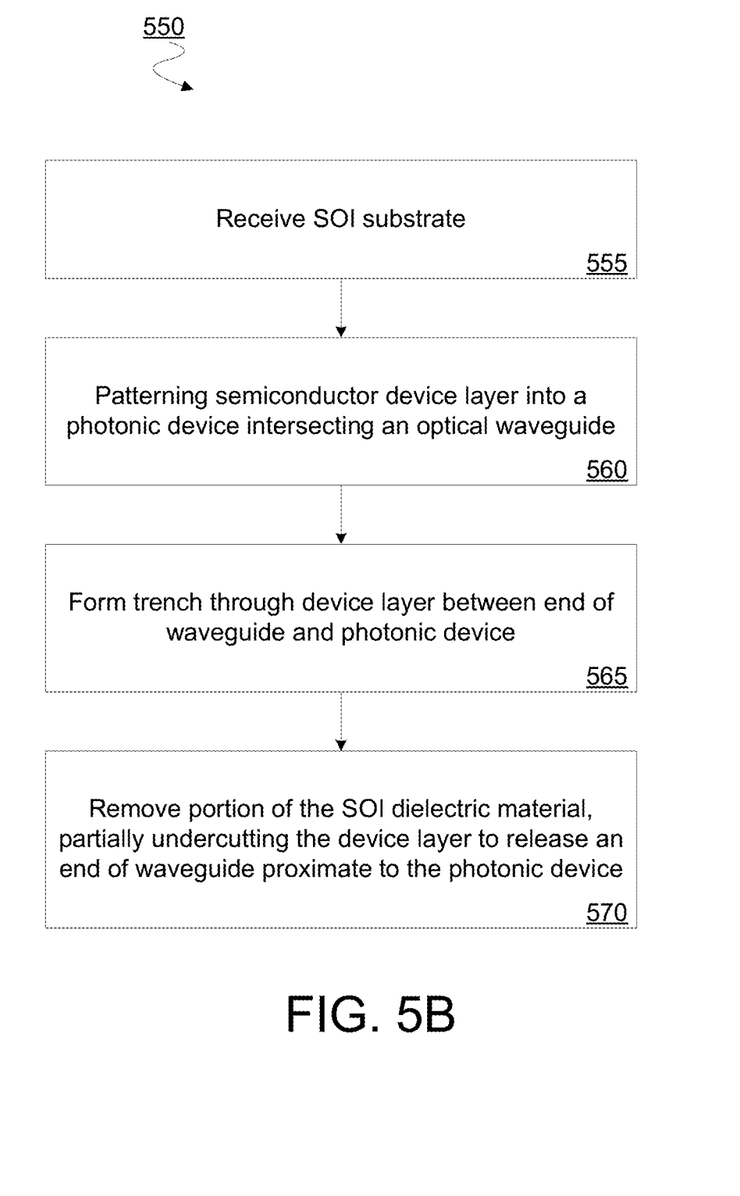
FIG. 5B is a flow diagram illustrating a method of fabricating a PIC including a monolithic physically displaceable optical waveguide and an adjacent photonic device, in accordance with an embodiment.

FIG. 5B is a flow diagram illustrating a method 550 of fabricating a PIC including a monolithic physically displaceable optical waveguide and an adjacent photonic device. Method 550 may be performed to form features described above in the exemplary PIC 100, 200a, 200b, 300, 330, 360 structures. Method 550 begins with receiving a SOI substrate, such as a silicon SOI substrate, at operation 555. At operation 560 a semiconductor device layer is patterned into a photonic device, such as an optical coupler, intersecting an optical waveguide also patterned into the semiconductor device layer (either concurrently with the photonic device, or before photonic device patterning, or after photonic device patterning). The photonic device may be patterned with any conventional lithographic and anisotropic etch process.

At operation 565, a trench is formed through the semiconductor device layer between an end of the waveguide and the photonic device. The trench formation may be performed concurrently with one or more of the waveguide patterning of the photonic device (i.e., with a same etch mask), or may be performed after patterning of the waveguide and photonic device as a separate masked etch. At operation 570 a portion of the SOI dielectric layer is removed (etched), partially undercutting the device layer to release an end of the waveguide proximate to the photonic device. In an exemplary embodiment, the undercutting etch operation is performed with a mask exposing an end length of the waveguide proximate to the trench etched at operation 565, the mask opening overlapping the trench. In further embodiments, method 550 includes fabricating an actuator structure to deflect the released waveguide actively. In one embodiment, the semiconductor device layer is further patterned into a MEMS actuator physically coupled to the waveguide, for example with a same mask used to pattern the waveguide, and/or photonic device. In further embodiments, at least a portion of the MEMs actuator is released at operation 570 concurrently with released of the waveguide end facet. In further embodiments, a passivation layer is deposited over the waveguide and photonic device prior to the release operation 570 with the release operation 570 selective to the passivation layer to form a shell encapsulating the released waveguide end.

Figure 6A:
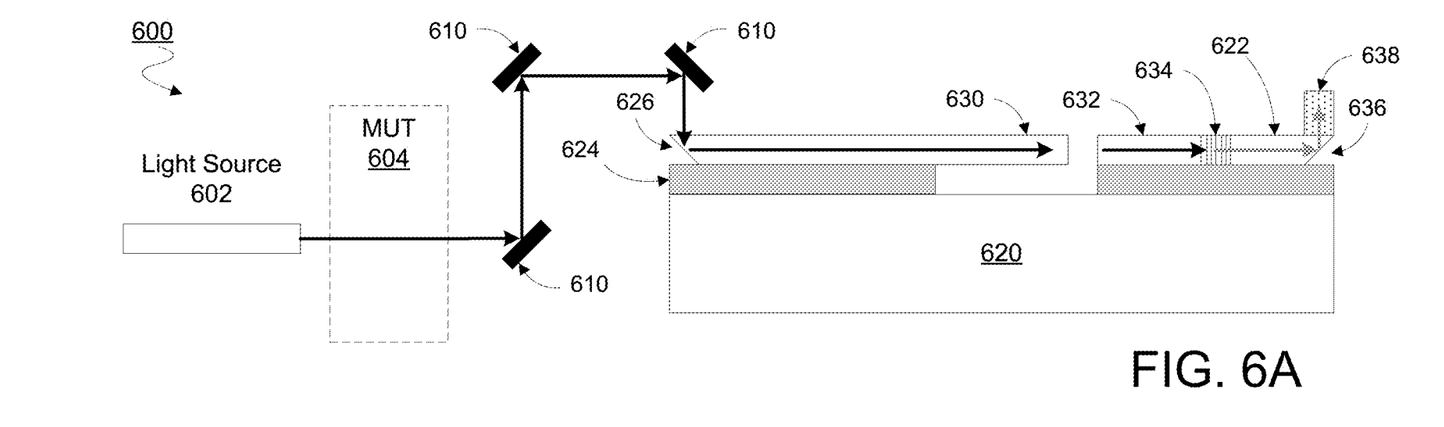
FIG. 6A is a plan view diagram illustrating elements of a device for performing transmission spectrometry according to an embodiment.

FIG. 6A is a plan view of a device 600 according to an embodiment for performing transmission spectrometry. Operation of device 600 may perform some or all of method 500, for example. In an embodiment, device 600 includes some or all of the features of the PIC 100, 200a, 200b, 300, 330, 360 structures discussed herein. For example, device 600 may include a silicon substrate 620, where spectrometer structures formed on a oxide layer 624 over silicon substrate 620 include a moveable waveguide 630, a photonic device 632 including an Echelle grating 634, and an output waveguide 622 extending from photonic device 632. During transmission spectrometry with device 600, a light source 602 may direct light through a material under test MUT 604. Light which is not absorbed by MUT 604 may pass through to be directed—e.g. via mirrors 610 and a coupler 626—into waveguide 630. Based on a current position of waveguide 630, Echelle grating 634 may diffract a particular wavelength of the light into waveguide 622. A detector coupled to waveguide 622—e.g. via an out-coupler 636—may detect a level of diffracted light for various wavelengths during a metering cycle.

Figure 6B:
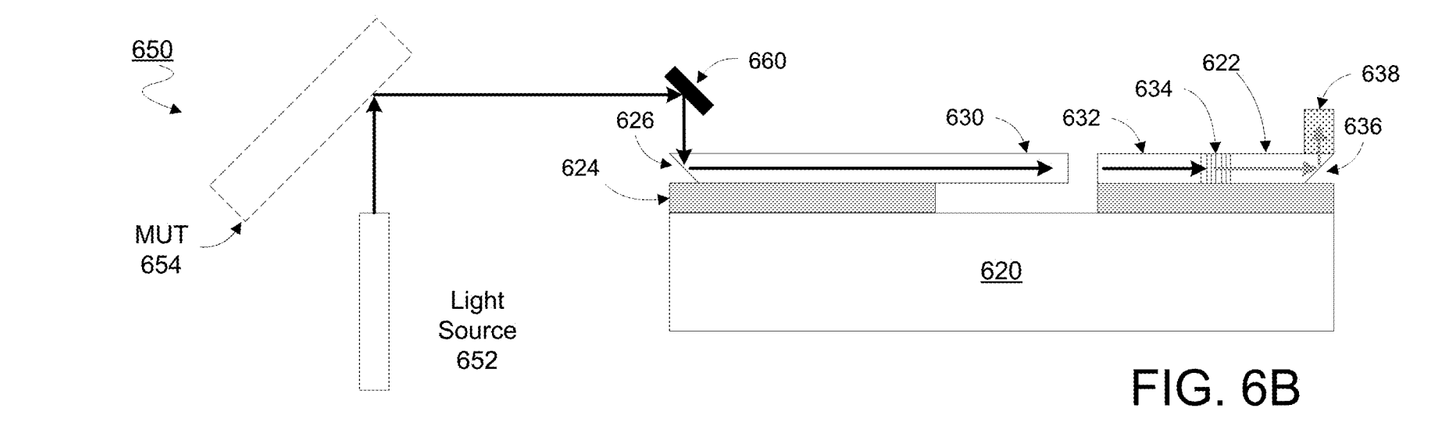
FIG. 6B is a plan view diagram illustrating elements of a device for performing reflection spectrometry according to an embodiment.

FIG. 6B is a plan view of a device 650 according to an embodiment for performing reflective spectrometry. To avoid obscuring various features of certain embodiments, some PIC structures of device 600—i.e. silicon substrate 620, oxide layer 624, coupler 626, moveable waveguide 680, photonic device 682, Echelle grating 684, waveguide 622, coupler 686 and photodetector 688—are shown as alternatively providing corresponding functionality in device 650. During reflective spectrometry with device 600, a light source 652 may direct light through a material under test MUT 654. Light which is not absorbed may reflect off of a surface of MUT 654 and be directed—e.g. via mirrors 660 and a coupler 626—into waveguide 630. Similar to operation in device 600, Echelle grating 634 may, based on a current position of waveguide 630, diffract a particular wavelength of the light into waveguide 622. A detector coupled to waveguide 622—e.g. via out-coupler 636—may detect a level of diffracted light for various wavelengths during a metering cycle.

Figure 7:
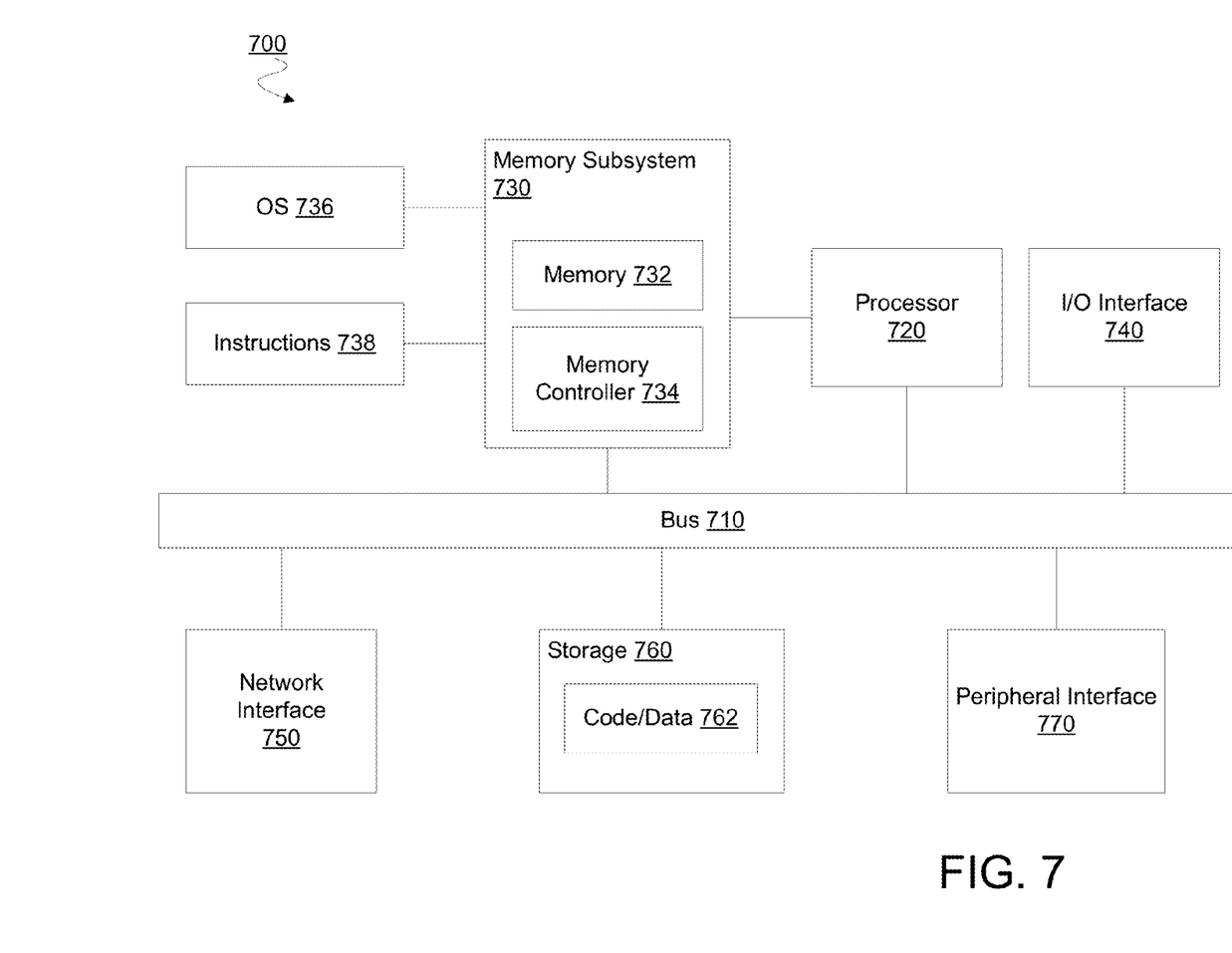
FIG. 7 is a block diagram illustrating elements of a computer system including a PIC according to an embodiment.

FIG. 7 is a block diagram of an embodiment of a computing system in which spectroscopy may be implemented. System 700 represents a computing device in accordance with any embodiment described herein, and may be a laptop computer, a desktop computer, a server, a gaming or entertainment control system, a scanner, copier, printer, or other electronic device. System 700 may include processor 720, which provides processing, operation management, and execution of instructions for system 700. Processor 720 may include any type of microprocessor, central processing unit (CPU), processing core, or other processing hardware to provide processing for system 700. Processor 720 controls the overall operation of system 700, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 represents the main memory of system 700, and provides temporary storage for code to be executed by processor 720, or data values to be used in executing a routine. Memory subsystem 730 may include one or more memory devices such as read-only memory (ROM), flash memory, one or more varieties of random access memory (RAM), or other memory devices, or a combination of such devices. Memory subsystem 730 stores and hosts, among other things, operating system (OS) 736 to provide a software platform for execution of instructions in system 700. Additionally, other instructions 738 are stored and executed from memory subsystem 730 to provide the logic and the processing of system 700. OS 736 and instructions 738 are executed by processor 720.

Memory subsystem 730 may include memory device 732 where it stores data, instructions, programs, or other items. In one embodiment, memory subsystem includes memory controller 734, which provides mechanisms for accessing memory device 732. In one embodiment, memory controller 734 provides commands to access memory device 732, which includes integrated circuitry in accordance with any embodiment described herein.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 may also correspond to interfaces in network interface 750.

System 700 may also include one or more input/output (I/O) interface(s) 740, network interface 750, one or more internal mass storage device(s) 760, and peripheral interface 770 coupled to bus 710. I/O interface 740 may include one or more interface components through which a user interacts with system 700 (e.g., video, audio, and/or alphanumeric interfacing). Network interface 750 provides system 700 the ability to communicate with remote devices (e.g., servers, other computing devices) over one or more networks. Network interface 750 may include an Ethernet adapter, wireless interconnection components, USB (universal serial bus), or other wired or wireless standards-based or proprietary interfaces.

Storage 760 may be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 may be generically considered to be a "memory," although memory 730 is the executing or operating memory to provide instructions to processor 720. Whereas storage 760 is nonvolatile, memory 730 may include volatile memory (i.e., the value or state of the data is indeterminate if power is interrupted to system 700).

Peripheral interface 770 may include any hardware interface not specifically mentioned above. Peripherals refer generally to devices that connect dependently to system 700. A dependent connection is one where system 700 provides the software and/or hardware platform on which an operation executes, and with which a user interacts.

Figure 8:
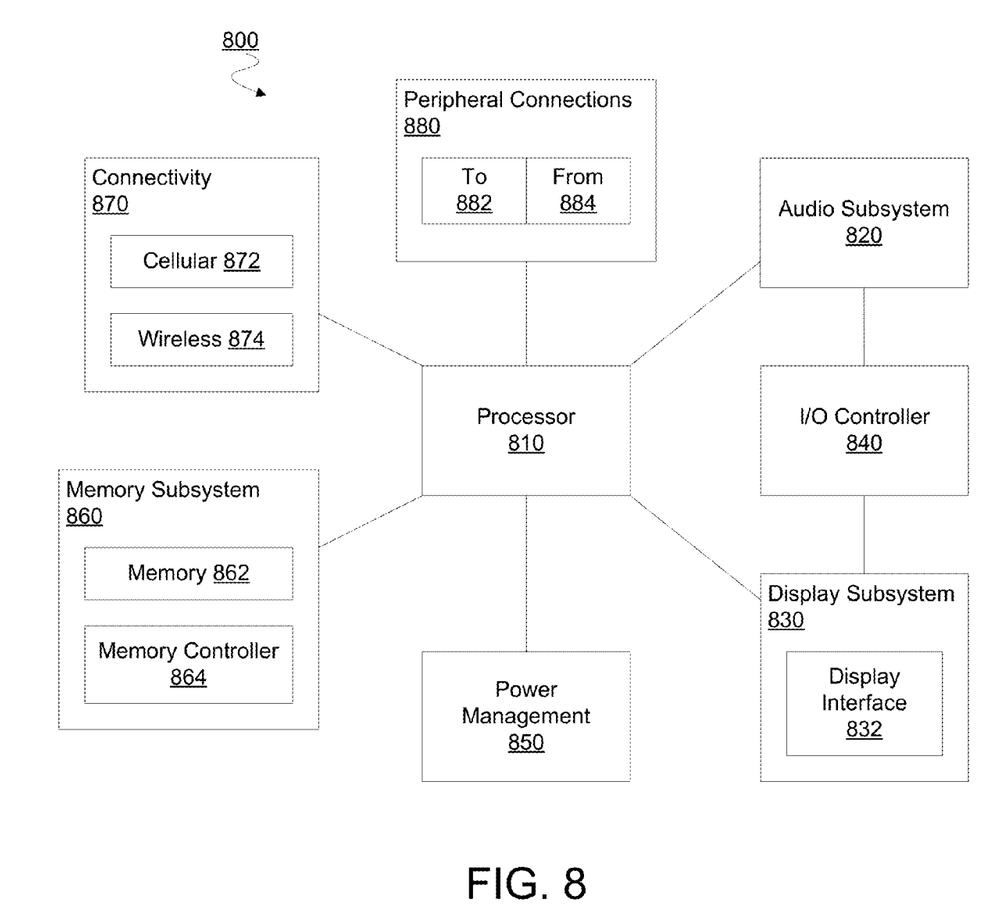
FIG. 8 is a block diagram illustrating elements of a mobile device including a PIC according to an embodiment.

FIG. 8 is a block diagram of an embodiment of a mobile device in which spectroscopy may be implemented. Device 800 represents a mobile computing device, such as a computing tablet, a mobile phone or smartphone, a wireless-enabled e-reader, or other mobile device. It will be understood that certain of the components are shown generally, and not all components of such a device are shown in device 800.

Device 800 may include processor 810, which performs the primary processing operations of device 800. Processor 810 may include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations may also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 may include display interface 832, which may include the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user.

I/O controller 840 represents hardware devices and software components related to interaction with a user. I/O controller 840 may operate to manage hardware that is part of audio subsystem 820 and/or display subsystem 830. Additionally, I/O controller 840 illustrates a connection point for additional devices that connect to device 800 through which a user might interact with the system. For example, devices that may be attached to device 800 might include microphone devices, speaker or stereo systems, video systems or other display device, keyboard or keypad devices, or other I/O devices for use with specific applications such as card readers or other devices.

As mentioned above, I/O controller 840 may interact with audio subsystem 820 and/or display subsystem 830. For example, input through a microphone or other audio device may provide input or commands for one or more applications or functions of device 800. Additionally, audio output may be provided instead of or in addition to display output. In another example, if display subsystem includes a touchscreen, the display device also acts as an input device, which may be at least partially managed by I/O controller 840.

There may also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that may be included in device 800. The input may be part of direct user interaction, as well as providing environmental input to the system to influence its operations (such as filtering for noise, adjusting displays for brightness detection, applying a flash for a camera, or other features).

In one embodiment, device 800 includes power management 850 that manages battery power usage, charging of the battery, and features related to power saving operation. Memory subsystem 860 may include memory device(s) 862 for storing information in device 800. Memory subsystem 860 may include nonvolatile (state does not change if power to the memory device is interrupted) and/or volatile (state is indeterminate if power to the memory device is interrupted) memory devices. Memory 860 may store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810) to control memory 862.

Connectivity 870 may include hardware devices (e.g., wireless and/or wired connectors and communication hardware) and software components (e.g., drivers, protocol stacks) to enable device 800 to communicate with external devices. The device could be separate devices, such as other computing devices, wireless access points or base stations, as well as peripherals such as headsets, printers, or other devices.

Connectivity 870 may include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector may allow device 800 to connect to certain peripherals that allow device 800 to control content output, for example, to audiovisual or other systems.

In addition to a proprietary docking connector or other proprietary connection hardware, device 800 may make peripheral connections 880 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a spectrometer device comprises a photonic device disposed over a substrate, the photonic device including a grating, a first waveguide disposed over the substrate, and a second waveguide disposed over the substrate, wherein one of the first waveguide and the second waveguide includes a released portion which is free to move relative to the substrate. The spectrometer device further comprises photodetector circuitry coupled to the second waveguide, and control logic to configure a plurality of positions of the released portion relative to the photonic device. For each of the plurality of positions, while the position is configured, the first waveguide is to exchange with the photonic device respective light from a material under test, the grating is to diffract a portion of the respective light into the second waveguide, and the photodetector circuitry is to take a respective spectrometric measurement of the material under test, including the photodetector circuitry to generate a signal indicating the level of the diffracted portion of the respective light directed into the second waveguide.

In an embodiment, the spectrometer device further comprises a microelectromechanical system (MEMS) actuator coupled to the released portion, wherein the control logic to configure the plurality of positions includes the control logic to signal the MEMS actuator. In another embodiment, the control logic to configure the plurality of positions includes the control logic to configure an angular deflection of the released portion. In another embodiment, the control logic to configure the plurality of positions includes the control logic to configure a lateral displacement of the released portion. In another embodiment, the spectrometer device further comprises analyzer logic to generate, for each of the respective spectrometric measurements taken for the plurality of positions, information specifying a correspondence of the spectrometric measurement to a respective wavelength.

In another implementation, a method comprises successively configuring a plurality of positions, relative to a photonic device of a monolithic photonic integrated circuit (PIC), of one of a first waveguide of the monolithic PIC and the second waveguide of the monolithic PIC. The method further comprises, for each of the plurality of positions, while the position is configured, exchanging respective light from a first material to the photonic device via the first waveguide, diffracting a portion of the respective light from a grating of the photonic device into the second waveguide, and taking a respective spectrometric measurement of the first material, including generating with a photodetector a signal indicating the level of the diffracted portion of the respective light directed into the second waveguide.

In an embodiment, successively configuring the plurality of positions is performed with a microelectromechanical system (MEMS) actuator. In another embodiment, the one of the first optical waveguide and the second optical waveguide includes a first portion anchored to a substrate and a second portion free to move relative to the substrate, and wherein successively configuring a plurality of positions includes configuring an angular deflection of the second portion. In another embodiment, the one of the first optical waveguide and the second optical waveguide includes a first portion anchored to a substrate and a second portion free to move relative to the substrate, and wherein successively configuring a plurality of positions includes configuring a lateral displacement of the second portion. In another embodiment, the method further comprises, for each of the respective spectrometric measurements taken for the plurality of positions, generating information specifying a correspondence of the spectrometric measurement to a respective wavelength.

In another implementation, a non-transitory computer-readable storage medium having stored thereon instructions which, when executed by one or more processing units, cause the one or more processing units to perform a method comprising successively configuring a plurality of positions, relative to a photonic device of a monolithic photonic integrated circuit (PIC), of one of a first waveguide of the monolithic PIC and the second waveguide of the monolithic PIC. The method further comprises, for each of the plurality of positions, while the position is configured, exchanging respective light from a first material to the photonic device via the first waveguide, diffracting a portion of the respective light from a grating of the photonic device into the second waveguide, and taking a respective spectrometric measurement of the first material, including generating with a photodetector a signal indicating the level of the diffracted portion of the respective light directed into the second waveguide.

In an embodiment, successively configuring the plurality of positions is performed with a microelectromechanical system (MEMS) actuator. In another embodiment, the one of the first optical waveguide and the second optical waveguide includes a first portion anchored to a substrate and a second portion free to move relative to the substrate, and wherein successively configuring a plurality of positions includes configuring an angular deflection of the second portion. In another embodiment, the one of the first optical waveguide and the second optical waveguide includes a first portion anchored to a substrate and a second portion free to move relative to the substrate, and wherein successively configuring a plurality of positions includes configuring a lateral displacement of the second portion. In another embodiment, the method further comprises, for each of the respective spectrometric measurements taken for the plurality of positions, generating information specifying a correspondence of the spectrometric measurement to a respective wavelength.

Techniques and architectures for providing on-chip spectrometry functionality are described herein. In the above description, for purposes of explanation, numerous specific details are set forth in order to provide a thorough understanding of certain embodiments. It will be apparent, however, to one skilled in the art that certain embodiments may be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A spectrometer device comprising:
   a photonic device disposed over a substrate, the photonic device including a grating;
   a first waveguide disposed over the substrate;
   a second waveguide disposed over the substrate, wherein one of the first waveguide and the second waveguide includes a released portion which is free to move relative to the substrate;
   photodetector circuitry coupled to the second waveguide;
   control logic to configure a plurality of positions of the released portion relative to the photonic device, wherein, for each of the plurality of positions, while the position is configured:
      the first waveguide to exchange with the photonic device respective light from a material under test;
      the grating to diffract a portion of the respective light into the second waveguide; and
      the photodetector circuitry to take a respective spectrometric measurement of the material under test, including the photodetector circuitry to generate a signal indicating the level of the diffracted portion of the respective light directed into the second waveguide.

2. The spectrometer device of claim 1, further comprising a microelectromechanical system (MEMS) actuator coupled to the released portion, wherein the control logic to configure the plurality of positions includes the control logic to signal the MEMS actuator.

3. The spectrometer device of claim 1, wherein the control logic to configure the plurality of positions includes the control logic to configure an angular deflection of the released portion.

4. The spectrometer device of claim 1, wherein the control logic to configure the plurality of positions includes the control logic to configure a lateral displacement of the released portion.

5. The spectrometer device of claim 1, further comprising analyzer logic to generate, for each of the respective spectrometric measurements taken for the plurality of positions, information specifying a correspondence of the spectrometric measurement to a respective wavelength.

6. A method comprising:
   successively configuring a plurality of positions, relative to a photonic device of a monolithic photonic integrated circuit (PIC), of one of a first waveguide of the monolithic PIC and the second waveguide of the monolithic PIC;
   for each of the plurality of positions, while the position is configured:
      exchanging respective light from a first material to the photonic device via the first waveguide;
      diffracting a portion of the respective light from a grating of the photonic device into the second waveguide; and
      taking a respective spectrometric measurement of the first material, including generating with a photodetector a signal indicating the level of the diffracted portion of the respective light directed into the second waveguide.

7. The method of claim 6, wherein successively configuring the plurality of positions is performed with a microelectromechanical system (MEMS) actuator.

8. The method of claim 6, wherein the one of the first optical waveguide and the second optical waveguide includes a first portion anchored to a substrate and a second portion free to move relative to the substrate, and wherein successively configuring a plurality of positions includes configuring an angular deflection of the second portion.

9. The method of claim 6, wherein the one of the first optical waveguide and the second optical waveguide includes a first portion anchored to a substrate and a second portion free to move relative to the substrate, and wherein successively configuring a plurality of positions includes configuring a lateral displacement of the second portion.

10. The method of claim 6, further comprising:
for each of the respective spectrometric measurements taken for the plurality of positions, generating information specifying a correspondence of the spectrometric measurement to a respective wavelength.

11. A non-transitory computer-readable storage medium having stored thereon instructions which, when executed by one or more processing units, cause the one or more processing units to perform a method comprising:
successively configuring a plurality of positions, relative to a photonic device of a monolithic photonic integrated circuit (PIC), of one of a first waveguide of the monolithic PIC and the second waveguide of the monolithic PIC;
for each of the plurality of positions, while the position is configured:
exchanging respective light from a first material to the photonic device via the first waveguide;
diffracting a portion of the respective light from a grating of the photonic device into the second waveguide; and
taking a respective spectrometric measurement of the first material, including generating with a photodetector a signal indicating the level of the diffracted portion of the respective light directed into the second waveguide.

12. The computer-readable storage medium of claim 11, wherein successively configuring the plurality of positions is performed with a microelectromechanical system (MEMS) actuator.

13. The computer-readable storage medium of claim 11, wherein the one of the first optical waveguide and the second optical waveguide includes a first portion anchored to a substrate and a second portion free to move relative to the substrate, and wherein successively configuring a plurality of positions includes configuring an angular deflection of the second portion.

14. The computer-readable storage medium of claim 11, wherein the one of the first optical waveguide and the second optical waveguide includes a first portion anchored to a substrate and a second portion free to move relative to the substrate, and wherein successively configuring a plurality of positions includes configuring a lateral displacement of the second portion.

15. The computer-readable storage medium of claim 11, the method further comprising: for each of the respective spectrometric measurements taken for the plurality of positions, generating information specifying a correspondence of the spectrometric measurement to a respective wavelength.

16. A system comprising:
a processor;
a memory; and
a monolithic photonic integrated circuit (PIC) coupled to at least one of the processor and the memory, wherein the monolithic PIC comprises the spectrometer device of any of claims 1 through 5.

17. A photonic sensor, comprising:
a first waveguide disposed over a substrate, the first waveguide to receive light corresponding to a material under test;
a grating disposed over the substrate, the grating to direct a portion of light received from the first waveguide into a second waveguide disposed over the substrate;
a microelectromechanical system (MEMS) actuator coupled to a released portion of at least one of the first and second waveguides;
a controller coupled to the MEMS actuator, the controller to cause the MEMS actuator to displace the released portion between a first and second position relative to the grating; and
photodetector circuitry coupled to the second waveguide, the photodetector circuitry to generate signals indicative of an intensity of the light directed into the second waveguide corresponding to the first and second positions.

18. The sensor of claim 17, further comprising analyzer logic to generate, for each of the positions, information associating the respective light intensity signals with corresponding wavelengths of the light.

19. The sensor of claim 17, wherein:
the MEMS actuator is to induce an angular deflection of the released portion;
the waveguides comprise silicon; and
the MEMS actuator comprises capacitive drive members.

20. A spectrometer, comprising:
a processor;
a memory coupled to the processor; and
a monolithic photonic integrated circuit (PIC) coupled to the processor, wherein the monolithic PIC comprises the photonic sensor of any one of claims 17-19.

* * * * *